United States Patent [19]

Senften

[11] 4,126,943
[45] Nov. 28, 1978

[54] WHEEL ALIGNMENT APPARATUS AND METHOD

[75] Inventor: David A. Senften, Florissant, Mo.

[73] Assignee: Hunter Engineering Company, Bridgeton, Mo.

[21] Appl. No.: 798,780

[22] Filed: May 20, 1977

[51] Int. Cl.$^2$ ............................................. G01B 11/26
[52] U.S. Cl. .................................... 33/228; 33/203.18; 33/288; 356/152
[58] Field of Search ............. 33/288, 228, 203, 203.18; 356/152

[56] References Cited

U.S. PATENT DOCUMENTS

| | | | |
|---|---|---|---|
| 2,972,189 | 2/1961 | Holub | 33/288 |
| 3,135,052 | 6/1964 | MacMillan | 33/288 |
| 3,164,910 | 1/1965 | Manlove | 33/203.18 |
| 3,181,248 | 5/1965 | Manlove | 33/203 X |
| 3,409,990 | 11/1968 | Vorpahl | 33/288 X |
| 3,782,831 | 1/1974 | Senften | 33/288 |
| 3,855,709 | 12/1974 | Hirmann | 33/203 X |

Primary Examiner—William D. Martin, Jr.
Attorney, Agent, or Firm—Gravely, Lieder & Woodruff

[57] ABSTRACT

A method of aligning vehicle wheels by correlating the individual alignment of the non-steerable wheels and the steerable wheels, and in which the direction of travel of the non-steerable wheel is determined and applied in the determination of the corresponding complementary alignment of the steerable wheels, and apparatus by which the method may be put into useful operation.

5 Claims, 8 Drawing Figures

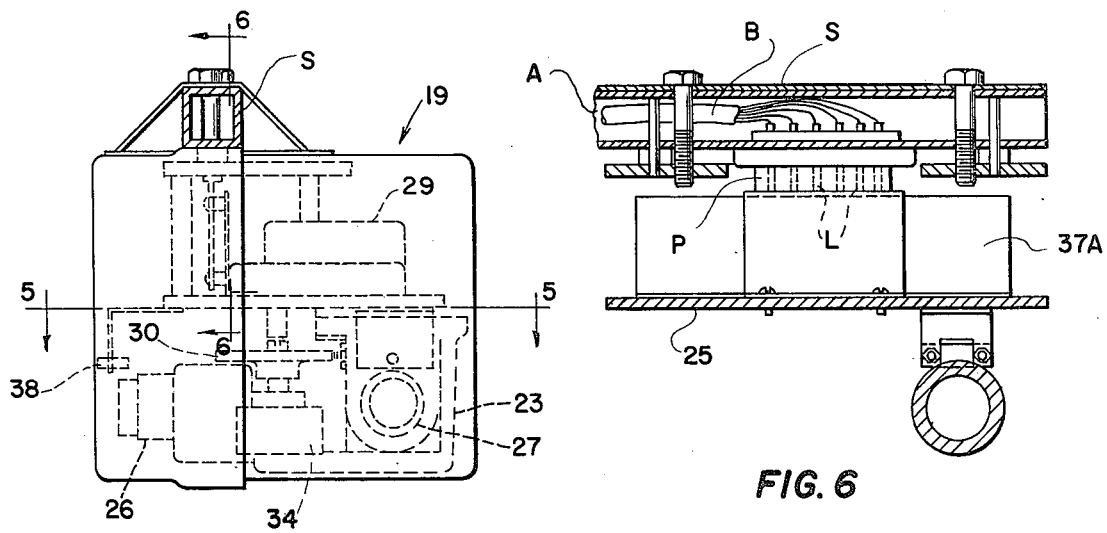
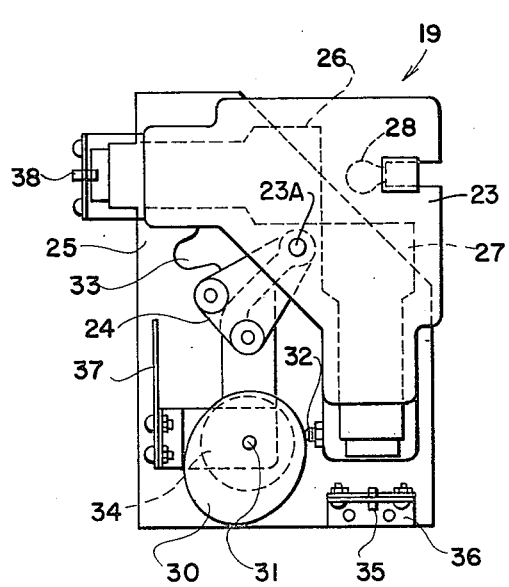
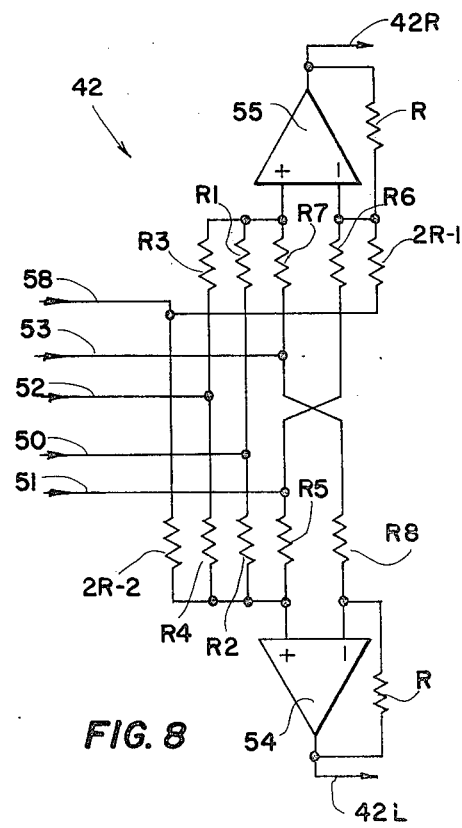
FIG. 4
FIG. 6
FIG. 5
FIG. 8

WHEEL ALIGNMENT APPARATUS AND METHOD

BACKGROUND OF THE INVENTION

Traditionally vehicle wheel alignment has been made in relation to a physical reference of the frame passing through the supposed center of the steerable wheels which are usually the front wheels. The difficulty with the traditional alignment theory is that the actual heading of the vehicle is not taken into consideration. It is known that makers of vehicle wheel alignment equipment generally call for preliminary rear wheel, non-steerable wheel, alignment to insure proper alignment of the steerable front wheels. However, it is difficult to align the non-steerable wheels as they are usually fixed which complicates the correction if required. In most wheel alignment shops and service facilities there is no provision made, or equipment provided, for physically relocating the position of the non-steerable wheels which are fixed by the manufacturer.

Examples of the prior art include Holub U.S. Pat. No. 3,337,961 issued Aug. 29, 1967; MacMillan U.S. Pat. No. 3,091,862 issued June 4, 1963; Manlove U.S. Pat. No. 3,164,910 issued Jan. 12, 1965; and Senften U.S. Pat. No. 3,782,831 issued Jan. 1, 1974. In the disclosure of Holub the apparatus comprise light projectors for each of a pair of wheels mounted so the light beam of each projector can be directed longitudinally as well as transversely. The angular orientation of the projected light beams is shown by viewing a scale so that all wheel alignment characteristics are required to be remembered by the operator without any way of automatically compensating the alignment of one set of wheels by the alignment of the other set of wheels. In MacMillan the device is limited to line of sight means and the disclosure recognizes only that the rear wheels follow the front wheels in paths symmetrically parallel to the front wheels. This relationship is not always true so that the mis-alignment of rear wheels is not considered at all. In Manlove the apparatus is designed primarily to check front wheel alignment by reading scales, but rear wheel track may also be checked using the same reading scales so that compensating information is not stored but must be remembered by the operator. In Senften the apparatus differs from the foregoing in that it is capable of electronically finding front wheel position relative to a reference which, while in no way associated with the alignment of the rear wheels, is a more accurate way of determining wheel position than by the use of mechanical scales.

In addition to the issued patents there is the pending application of Hunter, Ser. No. 675,347, filed Apr. 9, 1976, directed to wheel alignment apparatus and a method which does not involve means to automatically determine the front wheel alignment by information about the rear wheel alignment.

It is easily understood from these prior art disclosures that none is concerned with, nor provides apparatus for finding information about the alignment characteristics of non-steerable wheels and storing that information in such a way that it is useful in aligning the steerable wheels.

BRIEF DESCRIPTION OF THE INVENTION

This invention relates to a method of and apparatus for determining the effective alignment of vehicle steerable wheels using the alignment characteristics present in the non-steerable wheels.

The objects of the present invention are to provide a way of overcoming the deficiencies in the prior apparatus, to correlate the alignment of the steerable vehicle wheels with the alignment of the non-steerable wheels to arrive at a substantially true line of travel of the vehicle, and to provide apparatus that will simplify and effectively produce wheel alignment results more precisely true to the real line of vehicle travel.

The invention is embodied in apparatus by which the effective direction of travel of the non-steerable vehicle wheels can be determined with respect to the physical center line of a vehicle and stored in a memory device for subsequent use in respect of finding and correcting steering of the vehicle by using the stored information during the alignment of the steerable wheels.

More particularly the invention is directed to finding the alignment relationship both longitudinally and transversely of the vehicle longitudinal axis for the non-steerable wheels to determine the vehicle steer direction which is dictated by these wheels, utilizing that steer direction information when finding the alignment of the steerable wheels to determine what the correct alignment should be relative to the axis along the steer direction rather than along the normal longitudinal axis of the vehicle, and performing the alignment determining operation by devices mounted on the vehicle wheels, first on the non-steerable wheels and then on the steerable wheels, and connected into networks of the computer type which will perform the algebraic resolution of the angles and produce visual answers in terms of wheel toe.

BRIEF DESCRIPTION OF THE DRAWINGS

The invention herein is practiced in connection with apparatus shown in the accompanying drawings, wherein;

FIG. 4 is an elevation view of a typical light beam and sensor device taken along line 4—4 in FIG. 1;

FIG. 5 is a further view of the device of FIG. 4 as seen looking along the line 5—5 in FIG. 4;

FIG. 6 is a fragmentary section view taken along line 6—6 in FIG. 4;

FIG. 8 is a circuit detail for a portion of the block diagram of FIG. 7.

DETAILED DESCRIPTION OF THE EMBODIMENT

Figure 1:
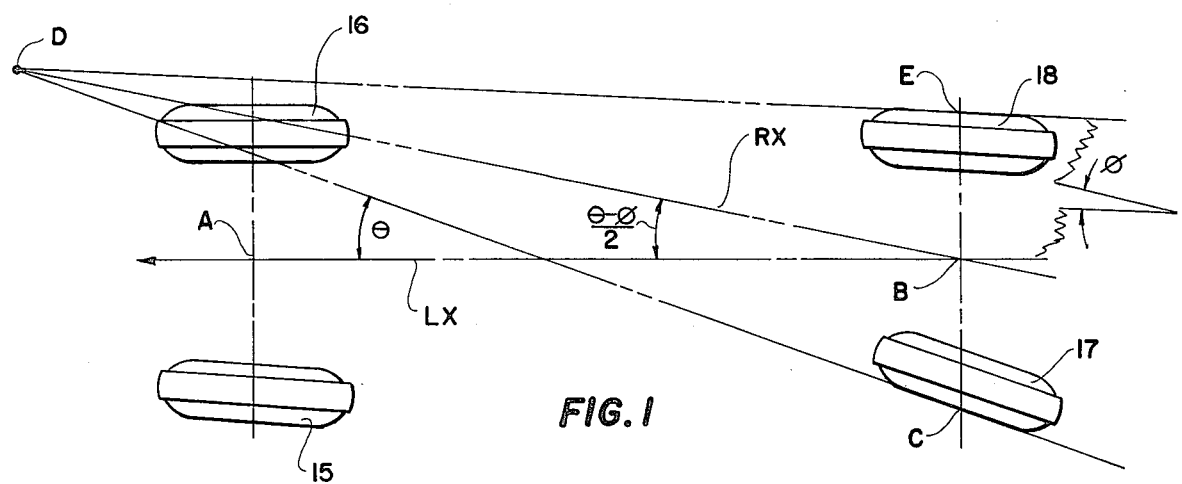
FIG. 1 is an enlarged schematic diagram illustrating a wheel alignment problem greatly exaggerated for purposes of explanation of the principles of the invention.

The method of correcting the alignment of vehicle wheels and the apparatus for determining the initial positions of the wheels so that alignment corrections can be made, requires determining the relationship of the individual wheels to some reference on the vehicle, such as the longitudinal center line of the vehicle rather than some portion of the body. It is assumed that the longitudinal axis of the vehicle is mid way of the front and rear wheels, and that if the planes of rotation of the wheels were parallel the geometry of the wheel alignment would be a rectangle. Accurate alignment of wheels is understood to be beneficial, both in terms of safety in handling the vehicle and in terms of better tire wear. The apparatus used for wheel alignment has generally concentrated on just the steerable wheels, because of the effect improperly aligned steerable wheels have on the operation of the vehicle.

It has been observed that the substantially true line of travel of a vehicle is dependent upon the direction of rolling movement of the non-steerable wheels, and that a driver will tend to turn the steerable wheels into a position to keep the vehicle in the line of travel dictated by the non-steerable wheels. The result of this driver correcting action is easily noted by observing the unusual position of the steering wheel required for straight ahead driving. The problem of correlating the alignment of the steerable wheels to the non-steerable wheels, so as to reduce or eliminate the corrective steering action by the vehicle driver is overcome in the following manner.

Angle measuring instruments are mounted first on the non-steerable wheels and manipulated to determine the angular relation of the plane of rotation of each non-steerable wheel relative to the center line of the vehicle. The angular relationship information is electronically measured and processed to produce a resultant reading that is the direction of travel of the non-steerable wheels relative to the vehicle center line. This resultant reading is electronically memorized for use when the same instruments are moved to the steerable wheels to locate the plane of rotation of these wheels relative to the vehicle center line. The steerable wheel angular relationship is corrected by the factor of the memorized information obtained from the non-steerable wheels, and a substantially true coordination of steerable and non-steerable wheels is obtained. The instrumentation for accomplishing the foregoing result can be either electro-optical, as is disclosed in Senften U.S. Pat. No. 3,782,831 of Jan. 1, 1974, or electro-mechanical, as is disclosed in Senften application, Ser. No. 675,332 filed Apr. 9, 1976, now U.S. Pat. No. 4,034,479 granted July 12, 1977. The apparatus in the foregoing disclosures is applied herein to obtain a new and unique result in which the angular relationship of each steerable and non-steerable vehicle wheel to the longitudinal center line of the vehicle is determined and used to arrive at a more clearly correct alignment of the steerable wheel based on the influence derived from the non-steerable wheels.

In FIG. 1 there is shown schematically the arrangement of vehicle steerable wheels 15 and 16, and corresponding non-steerable wheels 17 and 18. For illustrated purposes, the steerable wheel 15 is excessively toed-in and wheel 16 is positioned for zero toe, both shown relative to the longitudinal axis LX of the vehicle. The non-steerable wheel 17 is given a greatly exaggerated toe-in, while wheel 18 is positioned in a toe-out position, both relative to the longitudinal axis LX. This schematic view includes the alignment angles $\theta$(Theta) and $\phi$(Phi) which must be found and calculated electronically to yield the true direction of travel which the non-steerable wheels 17 and 18 will follow. That true direction is along resultant axis RX at the angle $(\theta - \phi/2)$ from the axis LX. This will force the vehicle to turn to the left, unless the steerable wheels 15 and 16 are turned to the right so that all wheels will be directed to keep the vehicle moving in the direction of the resultant axis RX. That resultant line of travel is not coincident with the vehicle axis LX, so the body of the vehicle will seem to be pointed at an angle to its true direction of travel and the steering wheel will be positioned as if executing a right turn.

The foregoing schematic view shows the problem connected with misaligned vehicle wheels which is that the driver of the vehicle must compensate for misalignment of the non-steerable wheels by turning the steerable wheels in the direction, right or left as the case may be, to keep the vehicle headed correctly. A solution to the problem is to determine the angular alignment of the plane of rotation of each wheel relative to axis LX, and to apply that information in an electronic device which will display the result and adjust the alignment reading of the steerable wheels to correct the problem.

Figure 2:
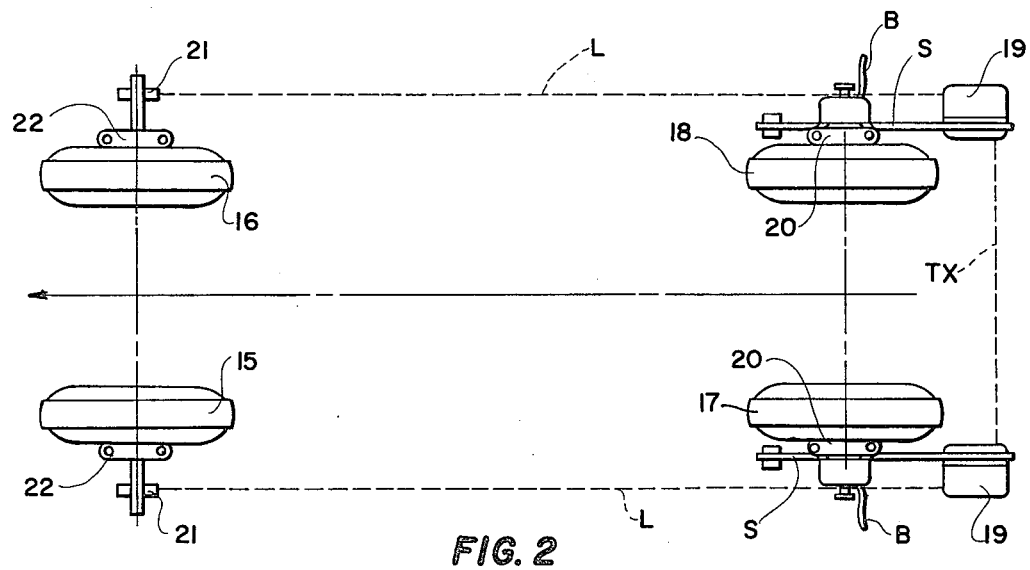
FIG. 2 is a schematic plan view of the usual vehicle front and rear wheels with the sensing apparatus in position on the non-steerable wheels.
Figure 3:
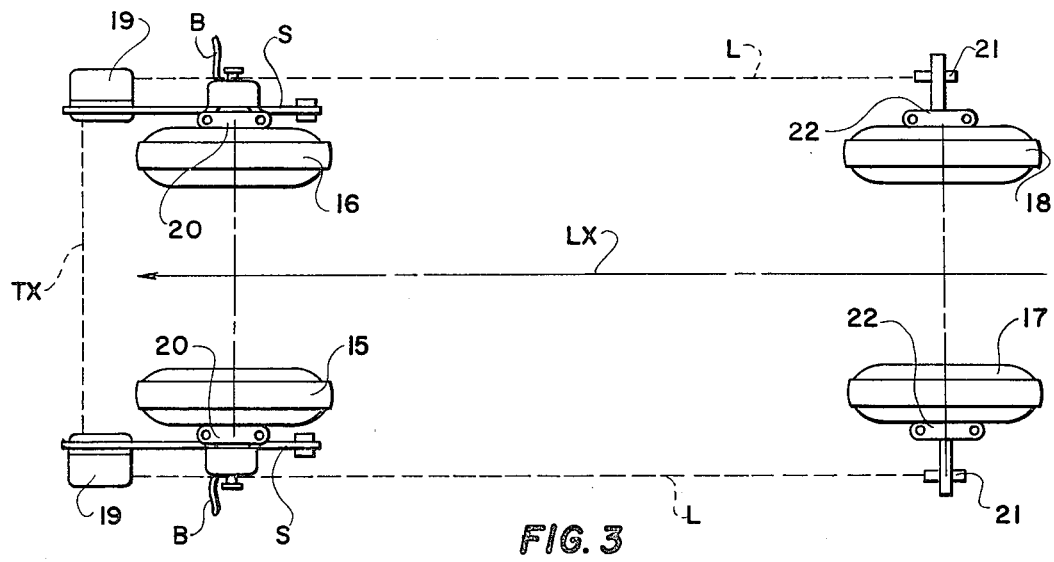
FIG. 3 is a schematic plan view similar to FIG. 1 but with the sensing apparatus reapplied to the steerable wheels.

An embodiment of means to carry out the foregoing alignment determination is shown in FIGS. 2 and 3 in a schematic arrangement. FIG. 2 shows angle measuring devices 19 attached to non-steerable wheels 17 and 18 by wheel mounting adapters 20 to lie in the plane of non-steerable wheel rotation. Each device 19 supports a dual electro-optical unit (see FIGS. 4 and 5) which projects light beams at 90° to each other so that one beam is directed across the vehicle to the opposite device 19 and the second beam is operatively related with the corresponding steerable wheel by being directed toward a reflective device 21 carried on adapters 22 attached to the corresponding (right or left) steerable wheel 16 and 15 where it is directed back along a path which may or may not have an angular relationship to the longitudinal axis LX. Thus, each device 19 will determine the angular relation of the plane of the wheel on which it is supported to the longitudinal axis LX, as well as to the transverse reference axis TX. The angular information is processed and stored in a memory for subsequent use in determining the alignment and the amount of correction necessary to coordinate the steerable wheel with the non-steerable wheels. In the foregoing description, it is intended that the apparatus can be either light beam directing means or means connected by a cord or line which serves an equivalent purpose. The use of light beam directing means is preferred.

FIG. 3 illustrates the arrangement of devices 19 attached to the steerable wheels 15 and 16, and the devices 21 attached to the non-steerable wheels 17 and 18. In making the switch of the devices 19 and 21, the devices on the wheels 16 and 18 at the right in FIG. 2 will be attached to the wheels 15 and 17 on the left in FIG. 3, and the other devices will be switched in like manner. The operation of devices 19 on the steerable wheels 15 and 16 will determine the angular relation of the plane of rotation of wheels 15 and 16 to the axis LX and to the transverse axis TX now at the steerable wheel end.

FIGS. 4 and 5 are views of a typical device 19 wherein a single casting 23 is pivoted on a fixed bracket 24 attached to plate 25. The casting carries light beam projectors 26 and 27 set at substantially right angles to each other so that a single source of light 28 carried by casting 23 will suffice for both. A suitable motor 29 drives a cam 30 which rotates about an axis 31 and oscillates the casting 23 about pivot axis 23A through follower arm 32, and spring 33 maintains contact of arm 32 on the cam 30. The cam has a profile which sweeps the light projectors 26 and 27 in one direction through an angle of about 240° of cam rotation so as to sweep through the reference axes which govern the angles to be measured, and through the remaining angle of 120° of cam rotation to the starting position. A potentiometer 34 rotates with the cam and produces a signal that is the analog of the angle of the light beam cast by the projectors 26 and 27. The speed of rotation during the sweep of 240° will be substantially one-half the speed of the return 120° to the starting position. The light beam (FIG. 5) cast from projector 27 is directed to sweep across a retro-reflector device 21 which returns the beam to a photo-cell 35 mounted on bracket 36 directly adjacent the projector 27. The retro-reflector 21 may be a corner cube reflector having silvered surfaces, or it may be a trihedral prism, both of which are well known devices. The signals are initially processed in circuits mounted on the circuit boards 37 and 37A. At the same time the other projector 26 casts a beam at the opposite device 19 where it sweeps across a photocell which is located in a position that is similar to the photocell 38 shown in FIG. 5 adjacent projector 26. The signals are processed in the circuits on circuit boards of that opposite device 19 and does not need to be reflected. As explained more fully in Senften U.S. Pat. No. 3,782,831, the devices 19 produce angular information which can be processed and visually shown on meters in terms of wheel alignment relative to the longitudinal axis LX. As seen generally in FIG. 6 the circuits (not shown) on circuit board 37A are collected in leads L and brought to a plug-in block P where suitable contacts are made. The contacts are connected by a wire bundle B which extends through the supporting arm A on the mounting adapters 20 (FIGS. 2 and 3) and emerges therefrom for connection to a suitable console (not shown) where display meters are situated.

Figure 7:
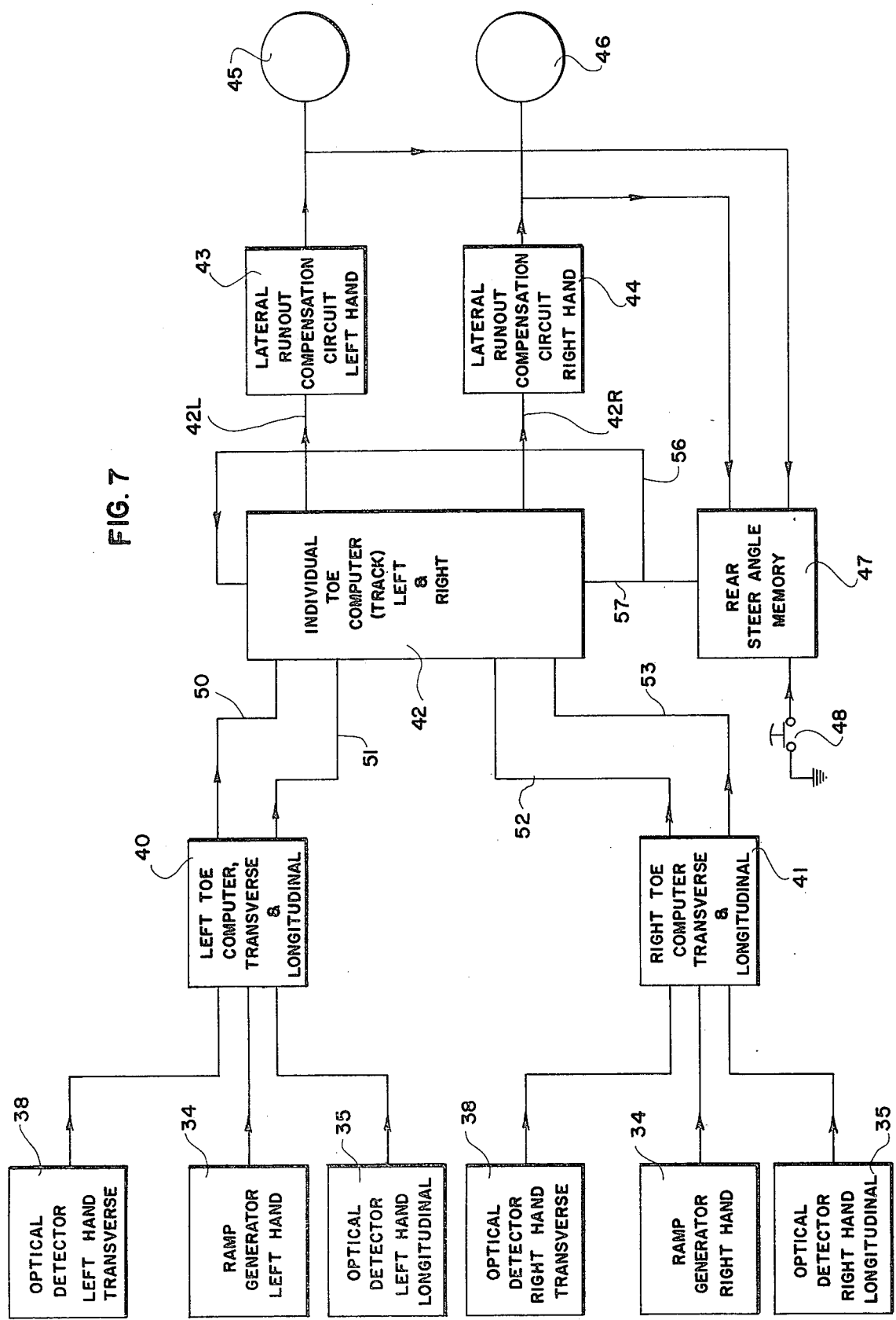
FIG. 7 is a block diagram of the electronic circuit of this invention.

However, in the present case, with the devices 19 mounted on the wheels 17 and 18, the sweep of the light beams from projectors 26 and 27 produces signals at the photocells 38 and 35, which signals are processed in a suitable circuit (FIG. 7). The information obtained in this manner is schematically shown in FIG. 1 where the angular position of wheel 17 relative to the longitudinal axis LX, and the angular position of wheel 18 relative to the longitudinal axis LX, and the angular position of wheel 18 relative to the same axis LX is electronically processed to arrive at the resultant angular line of travel of these wheels 17 and 18 which will be along the line BD or axis RX. That information is stored and used in connection with adjusting or correcting the alignment of the steerable wheels 15 and 16 with the devices 19 and 21 mounted as seen in FIG. 3.

In obtaining the angular position of the resultant axis RX, the electronic circuitry is set up to mathematically resolve the angularities in which $\theta$(Theta) is the angular position of wheel 17; $\phi$(Phi) is the angular position of wheel 18; and the angle CDE is $\theta$ minus $\phi$. From this it is found that the angle ABD which is needed is expressed as $\theta$ minus the quantity one-half of $\theta$ plus $\phi$. This reduces to one-half of $\theta$ minus $\phi$. In this resolution, it is to be understood that toe-in of a wheel is positive and toe-out is then considered negative.

The devices 19 and 21 are moved from the wheels of FIG. 2 to the wheels of FIG. 3 by crossing over so that the devices on the left side will now be on the right side, and those on the right side will be on the left side. At this time the devices 19 are operated in conjunction with the retro-reflectors 21 to find the angular positions of the steerable wheels 15 and 16 in terms of toe-in or toe-out relative to the longitudinal axis LX. This repositioning of the devices 19 and 21 when operated will indicate that (according to FIG. 1 and the resultant axis RX) the left wheel 15 is toed out and the right wheel 16 is toed-in. Correction is required to align the wheels 15 and 16 for the required positive toe-in relative to the resultant axis RX and not to the longitudinal axis LX.

In FIG. 2 the devices 19 are mounted by means 20 on the left and right wheels 17 and 18 such that the light beam projectors 27 (The devices have to be made for right and left hand mounting which is not necessary to show since it is well understood) angularly sweep the light beams L across the plane of rotation of the respective wheels. Each beam L is reflected from the retro reflector device 21 and at some angular position strikes the photocell 35 in the devices 19 at a time when the potentiometer ramp voltage is in the phase between zero and 240° of cam rotation. Simultaneously, the companion light beam projector 26 angularly sweeps a beam T transversely of the vehicle to strike the photocell 38 in the opposite device 19. The photocell 38 produces a signal which occurs at a time when the associated potentiometer ramp voltage is in the phase between zero and 240° of cam rotation. Each device 19 thus produces two bits of information about the angular position of the plane of rotation of the wheels 17 and 18 longitudinally and transversely of the axis LX.

FIG. 7 is a simplified block diagram of a circuit arrangement by which the signals from the respective photocells 35 and 38 in each device 19 on the left and right rear wheels 17 and 18 may be processed in relation to the ramp voltage generated by the respective potentiometers 34. It is necessary to understand, in accordance with the disclosure in Senften U.S. Pat. No. 3,782,831, that the angular sweep of the transverse beams T from each of the left and right projectors in devices 19 is sensed by the photocell 38 in the opposite devices. On the other hand, the sweep of the longitudinal beams L from each device 19 is returned by the retro-reflectors 21 and is sensed by the photocells 35. In this manner, angular information is obtained, and by proper circuit connections the signals sensed due to the left wheel angular position longitudinally and transversely of the axis LX is fed to a left toe computer circuit 40 where these signals are picked off of the potentiometer ramp voltage and become signals that are the analogs of the angles desired. Similarly, the angular information relative to the longitudinal and transverse position of the right wheel 17 is sensed and transmitted to the right toe computer circuit 41 where they are picked off the potentiometer ramp voltage and become signals that are the analog of the angles desired. If, for example, all the angular values obtained in this manner are "zero" the assumption is that the wheels 17 and 18 are square relative to the longitudinal axis LX.

The information about the angular positions of the wheels 17 and 18 is fed into a network 42 which is an individual wheel toe computer for the left and right wheels. This network 42 supplies information by leads 42 L and 42 R about the position of the wheels 17 and 18 into networks 43 and 44 which compensate for wheel runout (or wobble). The networks 43 and 44 are disclosed in Senften U.S. Pat. No. 3,892,042 of July 1, 1975, which provides for electronically compensating for wheel runout by the simple operation of rotating the respective wheels 17 and 18 to positions about 180° apart and electronically averaging the results to yield a runout corrective factor. The information developed in the networks 43 and 44 may be visually displayed on meters 45 and 46, but it is also important to store the information about the alignment of wheels 17 and 18 relative to the longitudinal axis LX in a rear steer angle memory circuit 47. The information is stored by pressing switch 48 and then releasing it to store the rear steer angle factor.

The detail circuit 42 of FIG. 8 is connected into the circuit of FIG. 7 such that the signal from the left hand transverse photocell 38 is brought in on lead 50 and the signal from the left hand longitudinal photocell 35 is brought in by lead 51. Similarly lead 52 brings in signal from the right hand transverse photocell 38 and lead 53 brings in the signal from the right hand longitudinal photocell 35. In all cases the signals are the analog of the angular position of the sweep of the light projectors as measured by the potentiometer ramp generators 34. This information is processed in the circuit of FIG. 8 through the operational amplifiers 54 and 55 and produces the readings displayed by meters 45 and 46. When the devices 19 are used on the non-steerable wheels a corrective factor produced by the resolution of the line of travel of these wheels is held in the memory 47 so that when the devices 19 are switched to the steerable wheels the corrective factor held in memory 47 is fed by leads 56 and 57 into the circuit 42. These leads are combined into a single lead 58 in FIG. 8.

As an example, the lead 50 is connected to resistances R-1 and R-2 and lead 52 is connected to resistances R-3 and R-4. These resistances are summing as to the signals from the photocells 38 in the left and right devices 19 respectively when responsive to the transverse angular measuring situation. The devices 19 also generate signals from the photocells 35, and the signal from the lead 51 is connected to resistances R-5 and R-6, while signal from the lead 53 is connected to resistances R-7 and R-8. These latter resistances provide a full value differencing of those signals, as the algebraic sense of the difference is opposite in the two summing amplifiers 54 and 55 and will cause one sum to increase and the other to decrease by the same amount. The corrective factor stored in the memory 47 (FIG. 7) is connected by lead 58 to resistances 2R-1 and 2R-2 and cause the sum of one amplifier to increase and the other amplifier to decrease by the same amounts. However, the amount of change is only one-half as large due to these resistances 2R-1 and 2R-2 having twice the value of the other resistors.

The devices 19 and 21 are then removed from the left and right rear wheels 17 and 18 and reapplied to the right and left steerable wheels 15 and 16. The devices 19 are corrected for lateral runout by means 43 and 44 before noted and that information is used to correct information that is being sought. Again the light projectors are oscillated by motors 29 in the devices 19 and the angular position of each wheel 15 and 16 relative to the longitudinal axis LX is determined and the information is fed into the network 42. At this time the alignment of the steerable wheels may be visually displayed on meters 45 and 46 either before or after the steer angle factor stored in memory network 47 is fed into the network 42. Assuming that the steer angle ABD of FIG. 1 has been stored in memory network 47, the addition of that factor to the alignment angles for the steerable wheels 15 and 16 will show that both of these wheels must be adjusted to the proper toe-in (positive) as if the longitudinal axis LX was shifted to coincide with the line BD which is the resultant axis RX for all wheels.

The view of FIG. 1 is shown greatly exaggerated to illustrate the uniqueness of the present invention. Normally the misalignment of the non-steerable wheels 17 and 18 is not greater than about one degree which would be difficult to show. Therefore, the resultant axis RX (line BD) is usually very close to the longitudinal axis LX and the amount of adjustment required for the steerable wheels 15 and 16 is easily obtained. However, serious misalignment of the non-steerable wheels 17 and 18 can be found by this invention and appropriate steps can be taken to correct the condition before the vehicle is put into service. Moreover, after a vehicle has been in an accident, the present apparatus can be used to determine whether the non-steerable wheels are too far out of position to permit safe operation.

What is claimed is:

1. Apparatus for determining the alignment of steerable vehicle wheels with reference to the line of travel of the vehicle non-steerable wheels, said apparatus comprising: a pair of angle measuring light beam projector devices, each having a pair of projectors to throw light beams generally transversely and longitudinally of the vehicle, and a pair of cooperating light beam reflective devices; attachment means for mounting said pair of angle measuring light beam projector devices and said pair of cooperating light beam reflective devices selectively and in opposition to each other in pairs on the vehicle non-steerable wheels and on the steerable wheels; photocell means carried by said angle measuring light beam projector device for operatively interrelating said pair of angle measuring light beam projector devices with each other transversely of the vehicle and simultaneously operatively interrelating said pair of cooperating light beam reflective devices longitudinally of the vehicle through said projected light beams and reflected beams, said photocell means carried by said angle measuring light beam projector devices generating signals from said cooperating light beam reflective devices and from light beams projected from each other which are the analog of the alignment position of the plane of rotation of the wheels on which the angle measuring light beam projector devices are attached; circuit means connected to said photocells of said angle measuring light beam projector devices to receive and transmit said analog signals; and means to display the analog signals in terms of wheel alignment values, said circuit means being operative when connected with the photocells of said angle measuring light beam projector devices attached on the vehicle non-steerable wheels to receive and store alignment information on the substantially true line of travel of such non-steerable wheels, and said circuit means being operative when connected with the photocells of said angle measuring light beam projector devices attached on the vehicle steerable wheels to apply the stored alignment information for the display of the alignment of the steerable wheels.

2. The apparatus set forth in claim 1 wherein each of said angle measuring light beam projector devices includes drive means operative to sweep the light beam back and forth through an angle which includes the position of said photocells of said other light beam projector device and the position of said cooperating light beam reflective devices.

3. The apparatus set forth in claim 1, wherein said circuit means includes a computer network having operational amplifiers for processing said analog signals developed from the non-steerable wheels and for processing said analog signals developed from the steerable wheels, and a memory network connected into said amplifiers.

4. A method for determining the alignment of vehicle steerable wheels from the existing alignment of the vehicle non-steerable wheels comprising the steps of finding the plane of rotation of each non-steerable wheel; measuring the angular relation of the plane of rotation of each non-steerable wheel to a reference axis of the vehicle; storing the measured difference between the angular relationships of the non-steerable wheels and the reference axis; finding the angular relation of the plane of rotation of the steerable wheels to the same reference axis; correcting the findings in the angular relation of the plane of rotation of the steerable wheels to said same reference axis by the measured difference between the angular relationship of the non-steerable wheels and the reference axis, and displaying the corrected findings.

5. A method for finding the alignment of vehicle wheels of the steerable type in terms of the substantially true line of travel of the wheels of non-steerable type, said method comprising: mounting angle measuring devices on the non-steerable wheels and cooperating devices on the steerable wheels; operating said angle measuring devices in conjunction with each other and with said cooperating devices to generate signals indicative of the angular position of the plane of rotation of the non-steerable wheels relative to a reference axis; processing said signals to arrive at the substantially true line of travel of the non-steerable wheels relative to the reference axis on the vehicle; removing said measuring devices and cooperating devices and repositioning the same on the steerable wheels and on the non-steerable wheels respectively; operating said angle measuring devices in conjunction with each other and with said cooperating devices to generate signals indicative of the angular position of the plane of rotation of the steerable wheels relative to the reference axis; combining the signals generated by operating said angle measuring devices with said processed signals to correlate the angles of alignment of the steerable wheels with the angular position of said non-steerable wheels in terms of their substantially true line of travel; and displaying the result of combining signals in terms of steerable wheel alignment relative to the substantially true line of travel.

* * * * *